United States Patent [19]
Marentic

[11] Patent Number: 4,520,053

[45] Date of Patent: May 28, 1985

[54] LAYERED COMPOSITE FOR APPLYING GRAPHICS HAVING AREAS OR BOTH MIRROR-LIKE METAL AND PATTERNED APPEARANCE

[75] Inventor: Frank J. Marentic, Birmingham, Mich.

[73] Assignee: Minnesota Mining and Manufacturing Company, St. Paul, Minn.

[21] Appl. No.: 521,843

[22] Filed: Aug. 10, 1983

[51] Int. Cl.³ .................................................. B60R 13/0

[52] U.S. Cl. ...................................... 428/31; 156/630; 156/634; 156/656; 428/156; 428/343; 428/354; 428/409; 428/457; 428/461; 428/463

[58] Field of Search ................. 428/40, 156, 164, 343, 428/354, 409, 457, 463, 913.3, 461, 901, 31; 156/630, 634, 656

[56] References Cited

U.S. PATENT DOCUMENTS

| | | | |
|---|---|---|---|
| 4,009,312 | 2/1977 | Hayashi et al. | 428/354 |
| 4,296,162 | 10/1981 | Jean | 428/354 |
| 4,367,920 | 1/1983 | Tung et al. | 427/163 |
| 4,427,733 | 1/1984 | Pöll et al. | 428/354 |

FOREIGN PATENT DOCUMENTS

| | | | |
|---|---|---|---|
| 0102206 | 3/1984 | European Pat. Off. | 428/31 |

*Primary Examiner*—James J. Bell
*Attorney, Agent, or Firm*—Donald M. Sell; James A. Smith; James V. Lilly

[57] ABSTRACT

The first face of a plastic film has a mirror-like, thin-film layer which is selectively etched away to reveal an opaque layer on the second face of the film. When viewed through the plastic film, the opaque layer has a patterned appearance such as engine-turn or brushed metal. An adhesive layer covering the opaque layer permits mounting onto a display surface such as a panel of an automobile.

16 Claims, 4 Drawing Figures

LAYERED COMPOSITE FOR APPLYING GRAPHICS HAVING AREAS OR BOTH MIRROR-LIKE METAL AND PATTERNED APPEARANCE

FIELD OF THE INVENTION

This invention concerns the art of creating graphics combining mirror-like areas typified by polished metal; patterned areas typified by brushed metal, engine-turn, woodgrain, or wrinkle finish paint; and colored areas typically representing designs, symbols, or alphanumeric characters. In particular, the invention concerns sheeting on which such graphics can be created, which sheeting includes a layer of adhesive permitting it to be applied to a display surface such as a panel of an automotive vehicle or of an applicance such as a computer or a radio.

BACKGROUND ART

In order to create graphics combining mirror-like, patterned and colored areas, one technique employs a flat sheet of polished metal, the polished face of which is selectively abraded or machined to develop a brushed or other patterned appearance. Coloring is selectively applied over portions of the face, e.g. by spray painting or screen printing. An adhesive may be coated onto the other face of the metal sheet for adhering it to a display surface.

A technique for simulating a sheet of metal having graphics combining the foregoing decorative effects employs a thin plastic film, to one face of which are successively applied hot-stamping layers that individually simulate bright, patterned, and colored layers. This layered composite is then adhesively bonded to a display surface which may be curved if the plastic sheet is flexible. Because such a layered composite is quite expensive, efforts have been made to develop paints which simulate polished and patterned metal surfaces, but only at considerable esthetic sacifice.

Another technique for simulating a sheet of metal having both mirror-like and patterned areas employs a thin plastic film, one face of which has a mirror-like thin-film metal coating that is covered by an adhesive layer which in turn is protected by a disposable, low-adhesion covering. After applying graphics to the exposed face of the plastic film, selected portions of that face are embossed, for example, to give a brushed metal appearance.

Other techniques are known for individually creating on a plastic sheet areas which simulate mirror-like metal or brushed metal, but no single item of prior art has been found by which both such appearances are created on one sheet of plastic except as noted above.

DISCLOSURE OF THE INVENTION

The present invention concerns a flexible layered composite which can be used to apply to a display surface graphics having areas that simulate mirror-like metal and areas of a patterned appearance such as the appearance of brushed metal, engine-turn metal, woodgrain, or retroreflective sheeting. The high quality appearance of the graphics is remarkable in view of the low cost at which they can be created.

Briefly, the novel layered composite comprises a strong, tough, flexible, dimensionally stable, transparent plastic film having (a) a mirror-like, thin-film metal layer covering the first face of the plastic film, (b) an opaque patterned layer covering the entire second face of the plastic film, and (c) an adhesive layer covering the opaque patterned layer.

The thin-film metal layer can be selectively etched away to provide areas of both mirror-like metal and patterned appearance when the layered composite is mounted by its adhesive layer to a display surface.

A technique for producing the patterned layer is to abrade or emboss said second face of the plastic film with a brushed or engine-turn pattern and to deposit an opaque, thin-film metal layer over the abraded or embossed surface. After then selectively etching away the mirror-like metal layer, patterned areas simulating brushed or engine-turn metal appear between the remaining mirror-like areas. When color has been applied to portions of the remaining mirror-like metal areas, the layered composite simulates a sheet of metal having graphics combining mirror-like, patterned, and colored areas.

Embossing of the second face of the plastic film can be produced by a heated roll which may produce an engine-turn pattern or random, closely spaced striae in the plastic film. When a thin-film metal layer is deposited over a pattern of closely spaced striae, the layered composite has the appearance of brushed metal where the mirror-like metal layer has been etched away.

Another technique for producing the patterned layer involves coating the second face of the plastic film with a layer which has a patterned appearance when viewed through areas of the plastic film from which the mirror-like metal layer has been removed. Such a coating may be retroreflective or may have a woodgrain appearance.

For economy any thin-film metal layer of the novel layered composite has the minimum thickness that will provide opacity, usually less than 40 nanometers.

When the adhesive layer of the novel layered composite is a pressure-sensitive adhesive, it should be covered by a disposable, low-adhesion liner. When so covered, the composite can be wound upon itself into roll form for convenience of storage and shipment.

To use the novel layered composite, substantially opaque colored graphics, typically alphanumeric characters, may be applied onto the mirror-like, thin-film metal layer. Over the colored graphics may be applied a transparent protective layer or resist. An etchant may then be applied to remove unprotected areas of the mirror-like metal layer, thus exposing the patterned layer to view through the transparent plastic film. The resulting composite comprises a strong, tough, dimensionally stable, flexible, transparent plastic film having (a) a mirror-like, thin-film metal layer covering selected areas of the first face of the plastic film, (b) an opaque patterned layer covering the entire second face of the plastic film, and (c) an adhesive layer covering the opaque patterned layer, which layered composite has areas of both mirror-like metal and patterned appearance when mounted by its adhesive layer to a display surface.

To summarize the method of the invention for creating graphics which can be applied to a display surface and simulate a mirror-like metal having areas of a patterned appearance, the method comprises the steps of (1) completely covering a first face of a strong, tough, flexible, dimensionally stable, transparent plastic film with an etchable, mirror-like, thin-film metal layer, (2) completely covering the second face of the plastic film with an opaque patterned layer, (3) applying a layer of adhesive over the opaque patterned layer to provide a layered composite and then, (4) etching away selected areas of the mirror-like, thin-film metal layer to provide a patterned appearance in those areas.

To protect the layered composite and its graphics, a clear protective coating may be applied, following step (4), over the first face of the plastic film. For exterior use, the clear coating preferably contains ultraviolet absorbers.

Subsequent to steps (1) and (2) and prior to step (4), substantially opaque colored graphics may be applied to selected portions of the thin-film metal layer, and a transparent resist may be applied at least over the graphics. Then in step (4) only areas between the resist are etched away. When the graphics comprise alphanumeric characters and the resist extends uniformly beyond the border of each, every character has a polished metal outline that greatly enhances its esthetic appearance.

Biaxially-oriented polyethylene terephthalate film is a preferred transparent plastic film, because it is relatively inexpensive, has excellent strength, toughness and dimensionally stability and is resistant to temperatures to which the novel layer composite might be exposed in use. When an oriented plastic film is to be embossed, it preferably includes a thermosetting coating which receives the embossing and is then cured. Other useful plastic films include cellulose acetate butyrate, polycarbonate and acrylic films. The film may also include dyes or pigments to give desired colorings to the opaque patterned layers. For example, a golden colored engine-turn pattern is achieved with a transparent yellow film.

BRIEF DESCRIPTION OF THE DRAWINGS

The invention is further explained with reference to the drawings wherein.

DETAILED DESCRIPTION OF THE INVENTION

Figure 1:
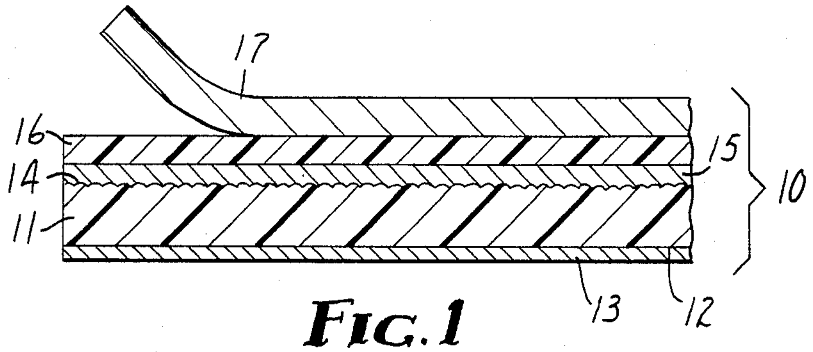
FIG. 1 is a schematic cross section of a flexible layered composite of the present invention; p

In FIG. 1, the flexible layered composite 10 has a flexible, dimensionally stable, transparent plastic film 11. Onto a first face 12 of the plastic film, a mirror-like, thin-film metal layer 13 has been deposited. The second face 14 of the plastic film 11 has been mechanically abraded, over this has been deposited second thin-film metal layer 15 which in turn is covered by a pressure-sensitive adhesive layer 16. Protecting the adhesive layer 16 is a disposable, low-adhesion liner 17, shown being peeled away to expose the adhesive by which the laminate 10 can be mounted onto a display surface.

When areas of the mirror-like metal layer 13 are etched away and the striae are viewed through the film in those areas, the appearance simulates brushed metal.

Figure 2:
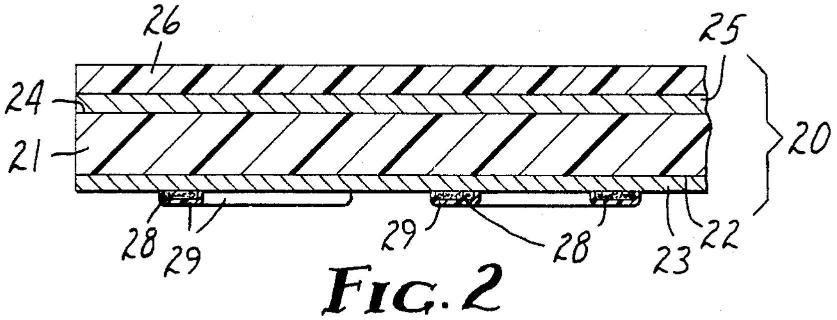
FIG. 2 is a schematic cross section of second flexible layered composite of the invention to which opaque, colored graphics have been applied.

The flexible layered composite 20 of FIG. 2 has a flexible, dimensionally stable, transparent plastic film 21, a first face 22 of which is covered by a mirror-like, thin-film metal layer 23. The second face 24 of the plastic film 21 is covered by a layer 25 which has been embossed with an engine-turn pattern (embossing not shown in FIG. 2). Covering the layer 25 is a heat-activatable adhesive layer 26 which is and nontacky at room temperatures.

Substantially opaque alphanumeric characters 28 have been printed on the exposed surface of the mirror-like metal layer 23, and each element of the graphics has been covered by transparent resist 29 which extends slightly beyond the border of each alphanumeric character.

Figure 3:
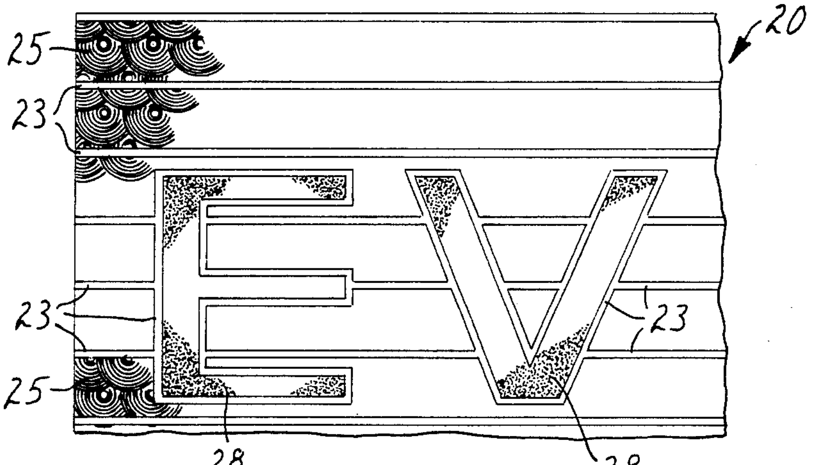
FIG. 3 is a plan view of the face of the graphics-bearing layered composite of FIG. 2 after areas of its mirror-like, thin-film metal layer have been etched away.

When an etchant is applied to the graphics-bearing face of the layered composite 20 of FIG. 2, areas of the mirror-like metal layer 23 between the resist 29 are removed, resulting in an appearance as illustrated in FIG. 3. There, the alphanumeric characters 28 and the mirror-like metal layer 23 are seen through the resist 29 which is not shown in FIG. 3 because it is transparent and hence almost invisible. In areas where the mirror-like metal has been etched away, the engine-turn pattern of the layer 25 is exposed to view.

Figure 4:
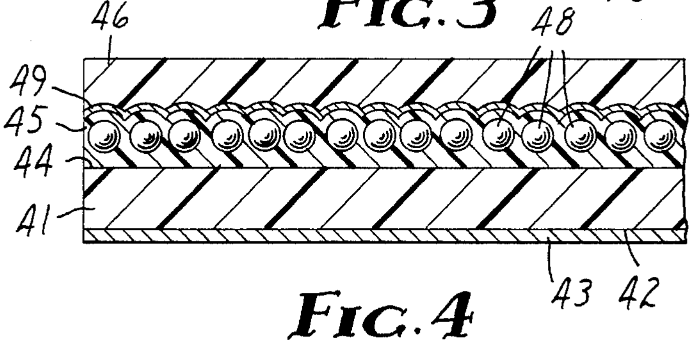
FIG. 4 is a schematic cross section of a third layered composite of the invention.

The flexible layered composite 40 of FIG. 4 has a flexible, dimensionally stable, light-transmissive plastic film 41, a first face 42 of which is covered by a mirror-like, thin-film metal layer 43. A retroreflective structure comprising a transparent binder material 45, transparent beads or microspheres 48 and a thin-film metal layer 49 covers the second face 44 of the plastic film. Retroreflective structures of this type are shown in FIGS. 1 and 2 of U.S. Pat. No. 4,367,920. Covering the metal layer 49 is an adhesive layer 46 by which the layered composite 40 can be mounted onto a display surface, after first removing areas of the mirror-like metal layer 43, as was done with the layered composites 10 and 20.

In the following examples, all parts and percentages are by weight unless otherwise stated.

EXAMPLE 1

One face of 0.05 mm, transparent, biaxially-oriented polyethylene terephthalate film was mechanically abraded to produce closely spaced striae, and the abraded surface was then vapor coated with aluminum metal to a thickness providing opacity, namely, approximately 80 nm. When viewed through the transparent plastic film, the deposited aluminum had the appearance of brushed aluminum. The smooth surface of the plastic film was vapor coated in the same manner to provide a mirror-like, opaque, thin-film metal layer. To the metal-covered abraded surface of the film was laminated an acrylic pressure-sensitive adhesive which previously had been coated out onto a silicone-treated polyester release liner. The adhesive thickness was approximately 0.025 mm. The resulting layered composite and liner could be wound into roll form for storage or shipment.

Onto the mirror-like metal layer were screen printed black alphanumeric characters of a polyester ink which were dried to a thickness of 0.005 mm. The screen openings were 0.055 mm. Using the same size screen, a transparent resist coating of a clear polyester ink was applied over each of the alphanumeric characters and dried to a thickness of 0.0025 mm. The border of the resist coating extended about 3 mm beyond the border of the underlying alphanumeric characters.

The printed face was subjected to a phosphoric acid etching solution maintained at a temperature of about 70° C. for 3 seconds, thus removing areas of the mirror-like metal layer that were not protected by the transparent resist. Each black alphanumeric character had a contrasting mirror-like metallic outline, and the outlined characters had a bold, high-quality appearance against the simulated brushed aluminum background.

EXAMPLE 2

One face of 0.05 mm, transparent, biaxially-oriented polyethylene terephthalate film was primed with a polyester adhesive. The primed surface was rotogravure printed with inks to produce a simulated woodgrain pattern when viewed through the transparent plastic film. The other face of the plastic film was then vapor coated with aluminum as in Example 1 to provide a mirror-like, thin-film layer. To the woodgrain layer was then laminated a precoated acrylic pressure-sensitive adhesive while being supported by a silicone-treated polyester liner. The adhesive coating was approximately 0.025 mm in thickness.

The mirror-like surface of the resulting layered composite was screen printed with black alphanumeric characters which were overcoated with a transparent resist coating followed by etching as in Example 1 to produce outlined characters similar in appearance to those of Example 1. The outlined characters had a bright, bold, high quality appearance against the subdued woodgrain background.

EXAMPLE 3

To one face of 0.05 mm, transparent, biaxially-oriented polyethylene terephthalate film was applied an adhesion-promoting coating. Over this was applied an ultraviolet-curable urethane-acrylate coating containing as an adhesion promoter 3% of vinyl chloride/vinyl acetate copolymer (Union Carbide VYHH) and having a viscosity of about 600 centipoise. This was knife-coated at an orifice of 0.05 mm, thus depositing a layer about 0.025 mm in thickness. This layer was contacted with a patterned die to produce an engine-turn pattern in its surface, and while in contact with the die, the layer was exposed through the polyester film to ultraviolet light, thus fixing the impressed pattern. The ultraviolet light was provided by four defocussed medium-pressure mercury lamps, each 62 cm in length and having an intensity of 200 watts/cm$^2$. The lamps were positioned 75 cm above the plastic film which was moving at 15 m/min.

The fixed pattern was vapor coated with aluminum as in Example 1, thus providing a patterned layer having the appearance of engine-turn metal when viewed through the transparent plastic film. The uncoated surface of the plastic film was likewise vapor coated with aluminum to provide a mirror-like, thin-film metal layer. The metal coating of the patterned layer was then laminated to an acrylic pressure-sensitive adhesive which had been coated on a silicone-treated polyester liner.

Black alphanumeric characters were printed onto the mirror-like metal surface of the resulting layered composite, and the characters were overprinted with transparent resist as in Example 1. After etching as in Example 1, the brightly-outlined black characters had a 3-dimensional appearance against the engine-turn metal background.

I claim:

1. A flexible layered composite comprising a strong, tough, flexible, dimensionally stable, transparent plastic film having
   (a) a mirror-like, thin-film metal layer covering the first face of the plastic film,
   (b) an opaque patterned layer covering the entire second face of the plastic film, and
   (c) an adhesive layer covering the opaque patterned layer, which mirror-like metal layer when selectively etched away, provides areas of both mirror-like metal and patterned appearance when the layered composite is mounted by its adhesive layer to a display surface.

2. Layered composite as defined in claim 1 wherein the pattern of the patterned layer is provided by discontinuities in the second face of the plastic film, and its opacity is provided by a second thin-film metal layer.

3. Layered composite as defined in claim 2 wherein said thin film includes a thermosetting coating in which said discontinuities are formed.

4. Layered composite as defined in claim 3 wherein the discontinuities are random, closely spaced striae which give the appearance of a brushed metal when viewed through etched-away areas of the mirror-like metal layer.

5. Layered composite as defined in claim 3 wherein the discontinuities have an engine-turn pattern which gives the appearance of an engine-turned metal when viewed through etched-away areas of the mirror-like metal layer.

6. Laminate as defined in claim 1 wherein the patterned layer comprises printing.

7. Layer composite as defined in claim 6 wherein the patterned layer gives the appearance of woodgrain when viewed through etched-away areas of the mirror-like metal layer.

8. Layered composite as defined in claim 1 wherein the patterned layer gives the appearance of a retroreflective sheet when viewed through etched-away areas of the mirror-like metal layer.

9. A flexible layered composite comprising a strong, tough, dimensionally stable, flexible, transparent plastic film having
   (a) a mirror-like, thin-film metal layer covering selected areas of the first face of the plastic film,
   (b) an opaque patterned layer covering the entire second face of the plastic film, and
   (c) an adhesive layer covering the opaque patterned layer, which layered composite has areas of both mirror-like metal and patterned appearance when mounted by its adhesive layer to a display surface.

10. Layered composite as defined in claim 9 having substantially opaque colored graphics covering substantial portions of the mirror-like, thin-film metal layer.

11. Layered composite as defined in claim 10 having a clear protective layer covering said colored graphics.

12. Method of applying to a display surface graphics which simulate mirror-like metal and patterned appearance in different areas, which method comprises the steps of
   (1) completely covering a first face of a strong, tough, dimensionally stable, flexible, transparent, plastic film with an etchable, mirror-like, thin-film metal layer, (2) completely covering the second face of the plastic film with an opaque patterned layer, (3) applying a layer of adhesive over the patterned layer to provide a layered composite, and (4) etching away selected areas of the mirror-like, thin-film metal layer to provide a patterned appearance in those areas.

13. Method as defined in claim 12 wherein step (2) involves abrading of embossing said second face followed by depositing an opaque, thin-film layer over the abraded or embossed surface.

14. Method as defined in claim 13 wherein said plastic film includes a thermosetting coating, and step (2) involves curing that coating while impressing a pattern in the coating.

15. Method as defined in claim 14 wherein step (2) invloves curing said thermosetting coating by exposure to ultraviolet radiation.

16. Method as defined in claim 12 wherein prior to step (4) substantially opaque colored graphics are applied to selected portions of the mirror-like, thin-film metal layer, and a transparent resist is applied over the graphics so that in step (4) only areas between the resist are etched away.

* * * * *

UNITED STATES PATENT AND TRADEMARK OFFICE
CERTIFICATE OF CORRECTION

PATENT NO. : 4,520,053

DATED : May 28, 1985

INVENTOR(S) : Frank J. Marentic

It is certified that error appears in the above-identified patent and that said Letters Patent is hereby corrected as shown below:

Col. 1, line 3, "OR" should read --OF--.

Col. 3, line 45, "p FIG. 2", delete the letter --p-- and start a new paragraph with the word --FIG.--.

Signed and Sealed this

*Nineteenth* Day of *November 1985*

[SEAL]

*Attest:*

DONALD J. QUIGG

*Attesting Officer* *Commissioner of Patents and Trademarks*